Jan. 7, 1964 — E. E. ZIEGLER — 3,116,813
VIBRATION DAMPING MECHANISM
Filed March 29, 1962 — 2 Sheets-Sheet 1

INVENTOR.
Edwin E. Ziegler
BY
Marvin M. Chaban
Attorney

Jan. 7, 1964    E. E. ZIEGLER    3,116,813
VIBRATION DAMPING MECHANISM
Filed March 29, 1962    2 Sheets-Sheet 2
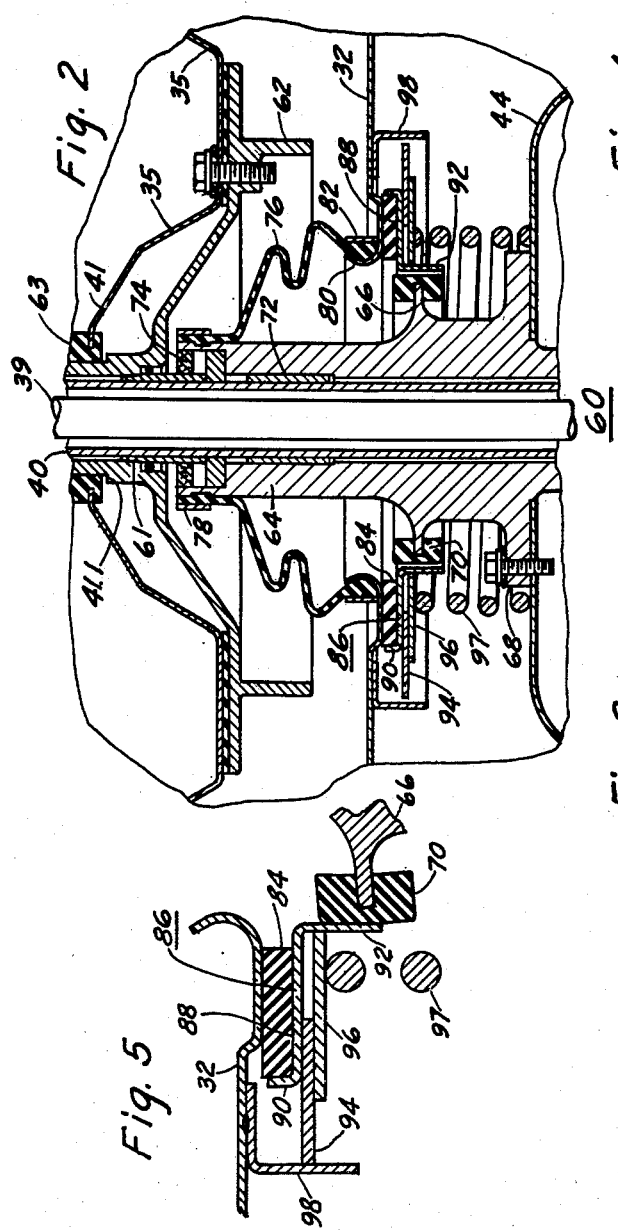
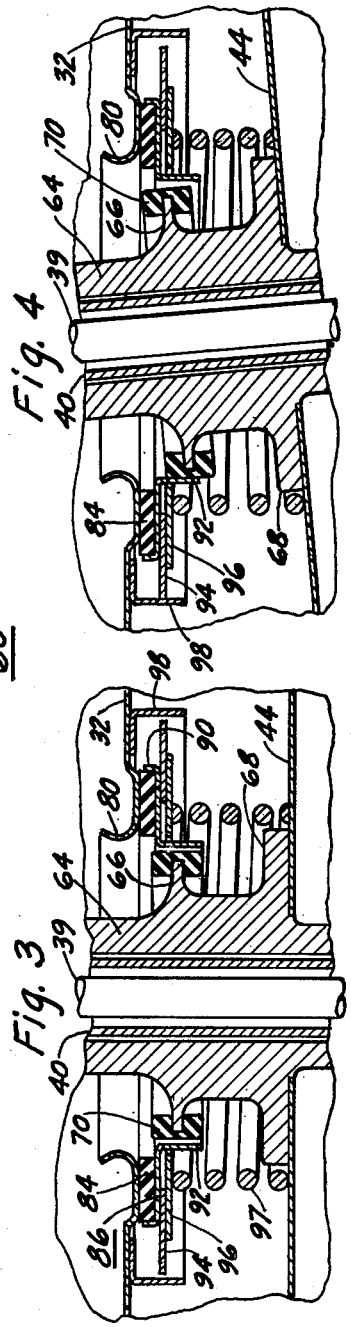
INVENTOR.
Edwin E. Ziegler
BY
Marvin M. Chaban
Attorney United States Patent Office 3,116,813
Patented Jan. 7, 1964

3,116,813
VIBRATION DAMPING MECHANISM
Edwin E. Ziegler, Schenectady, N.Y., assignor to General Electric Company, a corporation of New York
Filed Mar. 29, 1962, Ser. No. 183,459
11 Claims. (Cl. 188—1)

The present invention relates to vibration or gyration damping mechanisms and more particularly to those applicable to devices such as clothes washing machines.

In clothes washing machines and more particularly those in which the basket in which the clothes are washed is rapidly rotated and/or oscillated on a vertical axis to centrifugally extract water from the clothes, it has become the practice to allow the basket drive shaft to gyrate about the vertical axis in response to unbalance conditions in the basket. Extreme unbalance conditions which occur during the spin acceleration and deceleration of the basket can cause severe gyration of the drive shaft resulting in the basket striking and damaging the machine interior. Extreme unbalance which occurs during constant speed rotation at high speed can cause the basket to vibrate and shake excessively. To alleviate some of these conditions, the practice has arisen of providing frictional vibration damping of a fixed quantity to counteract and limit the tendency of the drive shaft and basket to gyrate. In one known form, a compression spring is used to constrain a frictional damping plate or snubber between the gyrating shaft assembly and an adjacent stationary structure. The position and characteristics of the damper plate surface result in the exertion of an axial force (F) of a magnitude equal to the product of the normal force exerted by the compression spring (N) times the friction constant (f) of the damper plate. This force inherently maintains a constant value for the structure and cannot be varied to meet extreme conditions.

It is therefore an object of the present invention to provide a frictional damping structure which exerts a predetermined frictional damping force for gyrations of the drive shaft below a predetermined amount and exerts an added frictional force for gyrations greater than the predetermined amount.

It is a further object of the invention to provide a variable action damping device in which the damping force exerted is dependent on the magnitude of the vibrations to be damped. To accomplish these and other objects, the present invention contemplates a snubbing or damping mechanism interposed between a drive shaft for a rotatable basket and stationary structure surrounding the drive shaft. The mechanism includes a plurality of frictional plates fitted about the drive shaft structure to allow a limited amount of relative sliding motion in a horizontal direction in response to gyrational movements of the drive shaft about its axis of rotation. These plates are biased to exert a normal force in a direction parallel to the rotational axis of the machine. In addition, at the periphery of one of these plates, an added frictional force may be exerted consequent to extreme radial movement of the drive shaft. The peripheral friction damps the gyratory effect of the drive shaft an amount in addition to the frictional forces exerted between successive plates in countering the radial force on the plate periphery. In summary, the mechanism provides a constant frictional damping force for normal or comparatively small gyrations of the drive shaft and a greatly increased frictional damping force in response to gyrations exceeding a predetermined magnitude.

The invention both as to its organization and method of opeartion, and the features and advantages thereof, will become apparent from the detailed description of the invention viewed in connection with the accompanying drawings in which:

FIG. 2 is a side sectional elevation of the drive shaft assembly in the area below the washing basket;

FIG. 3 is a more detailed side sectional elevation of the damping mechanism of FIG. 2;

FIG. 4 is a side sectional elevation as FIG. 3 with the drive shaft assembly in an extreme gyratory condition; and FIG. 5 is a partial view of FIG. 4 showing in greater detail the variable damping action according to the invention.

Figure 1:
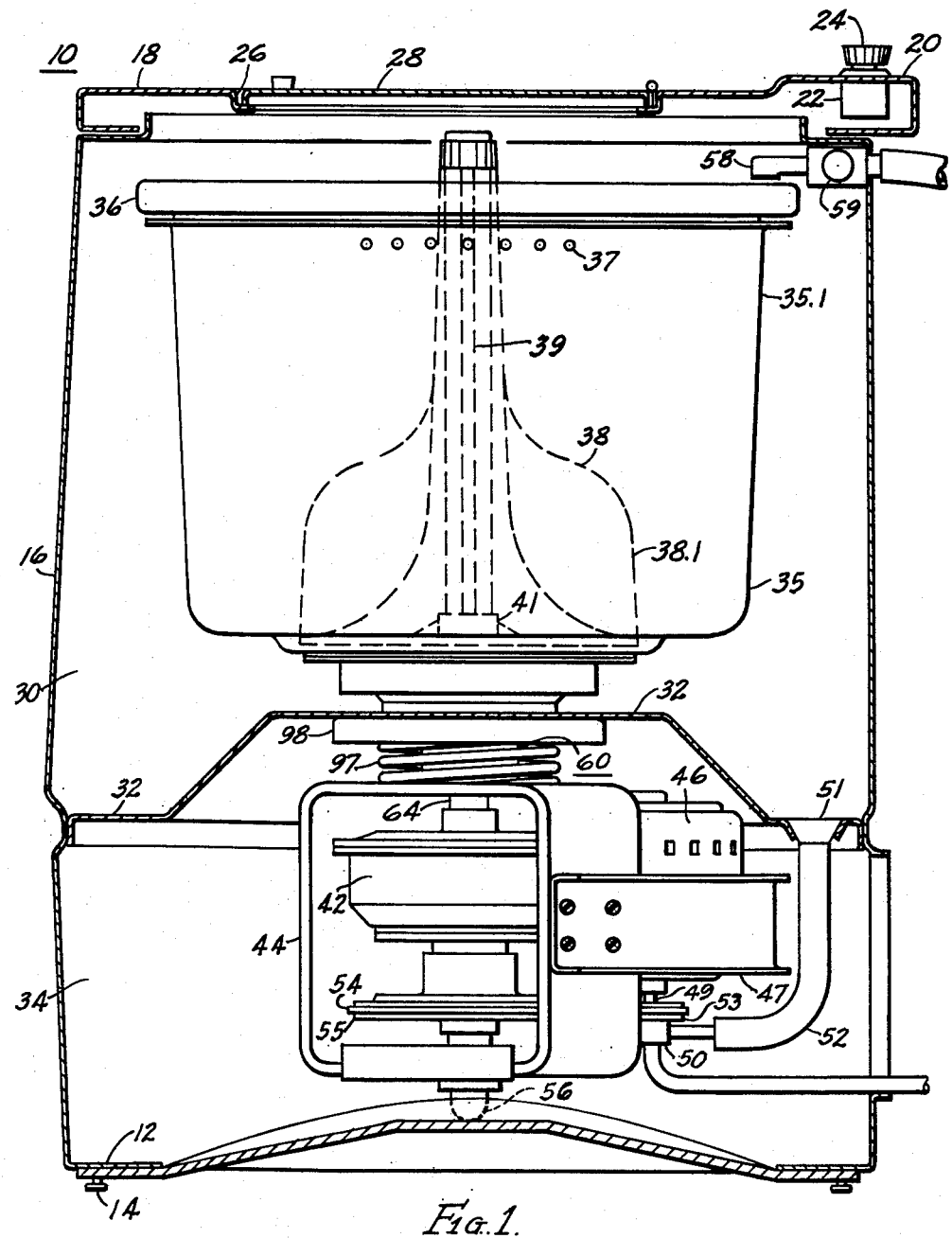
FIG. 1 is a vertical side elevational view of a washing machine utilizing my invention with the side cover removed.

Referring now to FIG. 1 of the drawings, the clothes washing machine 10 there illustrated, is of the generally known vertical axis type. More particularly, the machine 10 comprises a substantially rectangular base 12 that is supported upon independently adjustable feet 14 arranged to engage the floor or other supporting surface. An enclosing housing or outer casing 16 is removably carried by the base 12 and includes a conventional wrap around element including front, side and top walls. The sides of the top wall 18 are substantially flush with the side walls of housing 16 to form an upright substantially rectangular structure. At the rear of the top wall 18 is mounted a stepped backsplasher 20 which serves as a control console. The inner portion of this console contains the control mechanisms 22 for initiating a cycle of the proper length and type. By way of example, there is shown a timer control knob 24 which is rotatable manually to set control mechanism 22 for a properly operative cycle of the desired length.

A substantially centrally disposed top opening 26 is conventionally provided in top wall 18 to allow access to the interior of the housing 16. A conventional lid 28 is provided for the purposes of covering the top opening 26; the lid being hinged to top wall 18 at its rear edge and movable thereabout from a closed position to an open position allowing access to the interior of the casing 16 for loading or unloading the machine.

A generally rectangular drain tub 30 is provided in the upper portion of housing 16. Defining the lower wall of tub 30 is a bulkhead 32 welded or otherwise suitably sealed to the inner wall of the housing, and spaced a distance above base 12 to define a machinery compartment 34 arranged in the lower portion of housing 16. Within this compartment there are located the machine drive structure elements as will be described more fully.

Centrally positioned within tub 30 and mounted for rotation about a substantially vertical axis is the upstanding wash basket 35. The wash basket is generally imperforate, is in the form of an inverted frusto-cone, and has an open face adjacent the casing top opening 26 to allow access to the basket interior. About the periphery of the basket adjacent the open face, there is secured an annular balance ring 36 of high density material providing a comparatively large moment of inertia for the basket. The wash basket 35 is provided with an upwardly and outwardly flared sidewall 35.1 that terminates, as mentioned, below the access opening. Near its upper periphery, basket 35 contains a horizontally aligned series of apertures or slots 37 for centrifugally ejecting water from the tub. At the center of the spin basket there is positioned a vertical agitator 38 from which a plurality of radial vanes 38.1 extend. The agitator is mounted coaxially on the agitator shaft 39 and is oscillated thereby. Also mounted coaxially about the agitator shaft is a tubular spinner shaft 40, the upper end of which terminates a few inches above the wash basket lower surface. This spinner shaft is used to impart rotative motion from the transmission to the wash basket and to further this end, the upper end of the spin shaft is firmly secured to the spin basket at hub 41. The lower end of spin shaft 40 is mounted securely to the upper surface of transmission housing 42 so that the spin shaft and spin basket are co-rotative with the transmission housing 42.

Within the machinery compartment are located the machine elements necessary to drive the agitator and basket. These elements include a centrally positioned support structure 44 which serves as the foundation for supporting the transmission casing 42 a distance above base 12. This support structure 44 comprises an open rectangular frame secured about and protecting the transmission casing 42. Within the transmission casing 42 there is housed the drive linkage (not shown) necessary to transmit the motive power from drive motor 46 to the driven mechanism. These linkages may take any suitable form known in the art.

To drive the mechanism shown there is provided a main drive motor 46. Motor 46 may, as shown, be mounted to the support structure 44 by a suitable channel beam 47. Alternatively, the motor may be mounted to the casing 16 by using a conventional upright reinforcing member. (No showing has been made of this form of motor mounting.) With this alternative form of motor support on the cabinet, the motor weight is isolated from the basket support and may tend to lessen the vibration of the machine. In any event, the motor 46 is positioned in inverted fashion with its output shaft 49 depending from the motor structure. Secured about the motor shaft is a coupling to a drain pump 50 of any generally known type. The pump may preferably have its impeller fastened directly to the motor shaft so that the pump may expel waste water out the drain line on rotation of the motor in one direction. Within bottom bulkhead 32 there is a drain opening 51 which leads to a drain line 52 providing a path for expelling drain water from drain tub 30.

To provide the main drive connection to the machine, motor shaft 49 has mounted to it a pulley sheave 53 which carries a flexible V belt 54. This V belt is also laced about a pulley sheave 55 of the transmission housing 42, to impart driving effect thereto. The transmission housing 42 is mounted within the frame support 44 in parallel relationship to the motor 46, and housing 42 has extending upwardly from its internal transmission linkages, the central agitator shaft 39 which in its upward extent protrudes through the bearing retainer structure and into the drain tub 30.

The main drive motor 46 comprises a reversible induction motor of the split phase type which may be of the two-speed type, but for simplicity will be described herein as a single-speed motor. The motor, a typical appliance motor, may have a rating of about ⅓ horsepower and an operating speed at full load of about 1,725 r.p.m. The motor, in generally known fashion, may be energized through selectible circuitry for rotation in the clockwise or counterclockwise direction to effectuate the necessary agitate and spin operations.

Further viewing FIG. 1, it can be seen that the wash basket 35 and drive assembly are supported below the lower surface of support 44 at the lowermost point 56 or node of the drive assembly structure. The structure is gyratory about this node and is merely constrained from excess lateral motion by the remaining structural members of the machine. At node 56, there is provided a conventional bearing or pivot member (not shown) which allows gyratory movement of the drive assembly and basket about the vertical axis.

In addition, the general construction of washing machine 10 includes a water inlet conduit 58 with an opening poised above the open top of basket 35 for feeding inlet water to the basket under the control of water inlet solenoid 59. The single solenoid 59 is shown representatively to illustrate generally the operation of water fill.

Turning now to FIG. 2, there can be seen the drive shaft assembly 60. Extending vertically along the center axis of this assembly there is the agitator shaft 39. Fitted coaxially about the agitator shaft and spaced therefrom is the rotational spin shaft or spin tube 40. This tube, as mentioned previously, is connected at its lower extremity (by means not shown) to the top of transmission housing 42 and at its upper end tube 40 is connected through sleeve 61 to the urpright tubular extent of spin hub 41. The hub further includes an integral bracing structure 62 extending outwardly below the adjacent basket wall. This bracing structure may be secured by suitable means to the bottom surface of basket 35 outwardly of the central hub portion. The base of the basket, it can be seen, extends above the bracing structure and terminates at its center at a circular opening adjacent the hub 41. A suitable rubber sealing member 63 rests on a shoulder 41.1 of hub 41 to provide a water seal between the hub and the adjacent basket wall opening in a generally known manner. Spaced a distance below the hub there is circumposed about spin tube 40 a supporting sheath 64. The sheath is tubular in shape and depends vertically a short distance into housing 42. The sheath includes toward its lower end a pair of horizontal, spaced-apart circular projections 66 and 68. Lower projection 68 has suitable holes spaced about its circumference and bolts may be extended through these holes to secure lower projection 68 to the top surface of transmission support 44 for limited lateral movement therewith. The upper projection 66 has affixed about its outer periphery a resilient, flexible annulus or grommet 70 of rubber or the like, the functioning of which will be described more fully later. The support sheath 64 contains along its inner diameter suitable bearings 72 spaced about the spin tube to relatively position and guide the structure. Traveling further upwardly along this cover sheath there can be seen a water sealing structure including an annulus 74 of water seal or packing gland construction. Secured about the outer diameter of sheath 64 adjacent its upper edge is the top of rubber boot 76. This boot is held to the sheath by a conventional clamp ring 78. The boot itself is an imperforate water sealing cover for the machinery compartment. The boot is in the form of an accordion pleated flexible cone spanning the area between the top of sheath 64 and the central opening 80 at the inner diameter of bulkhead 32. At its lower end, boot 76 is affixed to the bulkhead by means of another clamping ring clip 82. The stationary structure to which the lower end of the boot is secured is an upturned arcuate flange 80 at the inner diameter of bulkhead 32 extending about the vertical machine axis in stationary fashion.

To provide a damping action on the drive assembly there is provided a snubbing or damping structure which includes a first frictional annulus 84 in contact with the lower surface of bulkhead 32 outwardly of flange 80. This frictional annulus, made of friction material such as asbestos base material, is held in position within a stepped, metallic collar 86. This collar has a horizontally disposed, flat annular base 88 from which there extends upwardly at its outer periphery a flange 90 fitted closely about the circumference of frictional annulus 84. Flange 90 terminates at a distance below the surface of annulus 84 which is nominally in contact with the bulkhead 32. The collar 86 also is formed to have at its inner periphery a downturned flange 92 which is positioned for surface contact with the outer wall of rubber grommet 70. In surface or rubbing contact with the underside of flat base 88 is a first frictional ring member or plate 94. This member preferably of steel or other metal has an outer diameter greater than that of collar member 86 at flange 90, and its inner diameter is smaller than the outer diameter of collar 86 (at flange 90) to insure surface contact between the adjacent surfaces of these members for all conditions. Below member 94 is a second flat frictional member 96 fabricated of steel or other suitable material. This member 96 is annular in shape and has an inner diameter which fits closely about the outer diameter of downturned flange 92. The outer diameter of annular member 96 is of necessity greater than the inner diameter of the first frictional member 94 for reasons which will become apparent.

Also positioned about the vertical machine axis is a heavy helical compression spring 97. This compression spring at its bottom end is constrained against the upper horizontal surface of support structure 44. The upper end of compression spring 97 bears against the lower surface of the bottom frictional member 96 and constrains the member into surface contact with the adjacent frictional contact ring 94. The compression spring also serves to maintain the upper frictional ring 94 in surface contact with horizontal ring 88 of collar 86 and thereby maintains frictional annulus 84 in contact with the horizontal extent of stationary bulkhead 32. The damping assembly further includes a downturned flanged collar 98 which is affixed at its upper end to the stationary bulkhead 32 coaxially to the machine drive axis. The flanged collar 98 extends vertically past the damping rings or friction members and is positioned horizontally a short distance from the outer periphery of the upper and larger frictional member 96, with the drive assembly in its normal position.

The general mode of operation of the machine, in general, is quite conventional in that clothes to be washed are placed in the basket 35 and the knob 24 is set to drive the machine through its operative cycle. The cycle includes a fill of water followed by oscillation of agitator 38 for a fixed time period. For this oscillation, the motor 46 is energized for rotation in one direction and drive mechanism within transmission casing 42 will oscillate shaft 39 and agitator 38. Following the conclusion of the time set for the completion of the agitate period, the basket is rotated at high speed to centrifuge out the water from basket 35 and such clothes as may be contained therein. For high speed rotation, the motor 46 rotates its drive shaft 49 in the opposite direction causing transmission casing 42 to rotate. Rotation of the transmission casing rotates spin tube 40, hub 41 and basket 35. Liquid from the basket is ejected through apertures 37 to tub 30 for flow out drain opening 51, drain line 52 and pump 50 which is also rotated. At the conclusion of the spin cycle, the machine is driven through one or more oscillating rinse periods, each followed by high speed spin.

During acceleration toward high speed spin, the clothes in the basket may tend to distribute themselves along the basket wall eccentrically. This eccentric distribution causes a dynamic unbalance in the accelerating system. When these unbalance conditions occur, the entire basket and shaft assembly structure may wobble, vibrate or gyrate eccentrically about node 56. These vibrations if allowed to occur undampened may cause the basket to strike the adjacent housing wall imposing severe damage to the machine, the basket and the casing sidewall. The damping mechanism 60 is employed herein to absorb and reduce these eccentric motions to a safe level.

The operation of the damping mechanism may be described as follows: When the basket moves eccentrically, this eccentric motion is transmitted through hub 41 and sleeve 61 to spin tube 40. From the spin tube, these eccentric forces are transmitted laterally to sheath 64. It should be noted that sheath 64 and support 44, which is secured thereto, do not oscillate or rotate with the axial shafts but will travel laterally or vibrate eccentrically about node 56 under forces received from the basket 35. Thus as sheath 64 moves laterally, the motive force is transmitted to upper projection 66 and grommet 70. The grommet will absorb some of the lateral forces and will transmit others to the flange 90 of adjacent collar 86. These transmitted forces will cause a rubbing action of friction annulus 84 contained within collar 86 against the adjacent bulkhead 32, tending to absorb some of the damping forces by this rubbing action.

At this time it may be noted that annulus 84 is constrained against the adjacent bulkhead or stationary wall 32 by the action of compression spring 97 transmitted through intermediate frictional plates 94 and 96. This compression spring is compressed to exert a normal force of predetermined quantity against annulus 96 which exerts a force of the same quantity axially against horizontal ring 88 and ultimately to annulus 84. The relative frictional motion between the intermediate plates is of such minor amount, so that for all purposes this interfrictional loss can be neglected or omitted from consideration at this time. Thus, for vibrations of the kind described, the frictional force exerted to damp the eccentric vibrations is equal to the spring force (N) times the frictional constant $(f)$ for annulus 84 rubbing against bulkhead 32.

When however the eccentric forces become great, or at least great enough to displace grommet 70 and flange 92 to the position of FIG. 4, an added damping action occurs. Collar 86, it will be remembered, is in enforced surface contact with annulus 94 due to the force exerted by spring 97 maintaining this contact force at a predetermined level. Therefore, the movement of collar 86 frictionally laterally drives the upper damper plate 94 outwardly from the machine axis into contact with depending flanged collar 98. Collar 98 is stationary so that it restrains annulus 94 from further outward motion and exerts a counter thrust on annulus 94 tending to drive the annular plate 94 inwardly toward the vertical machine axis. This counter thrust on plate 94 causes relative countering frictional forces in both base 88 of collar 86, and plate 96, along the surfaces of contact between the elements 86, 94 and 96. These countering frictional forces cumulatively add to the damping effect exerted by annulus 84 on bulkhead 32 and serve to dampen the extreme vibrations which caused friction plate 94 to contact collar 98. Thus, when eccentric forces reach an amount sufficient to cause this contact, an added damping force is exerted to counter this eccentric or lateral force and will tend to limit the motion away from the vertical axis. It should also be noted that once the eccentric forces have reached the quantity sufficient to induce the added frictional damping effect, the additional frictional effect will engender a relatively constant additional countering force.

In summary then, when eccentric or gyrational forces acting on the drive assembly are less than a predetermined amount, the countering frictional damping force is relatively constant. When the eccentric forces exceed this predetermined amount, they are countered by an added frictional or rubbing force between the damping plates 94, 96 and the horizontal base portion 88 of collar 86. This added damping is exerted only when needed and will aid in damping the excesses causing it.

While there has been described what is at present thought to be a preferred embodiment of the invention, it will be understood that modifications may be made therein and it is my intent to cover in the appended claims, all such modifications which fall within the true spirit and scope of the invention.

What is claimed is:

1. In a mechanism having a generally vertical rotatable shaft having fixed to its upper end a body which may include an unbalanced load, drive means arranged to rotate said shaft, a housing disposed about said body and providing journalling means for said shaft, and means for supporting said housing for gyratory movement about a node; the improvement in means for damping said movement, comprising first and second and third annular members encircling said housing and capable of axial displacement relative thereto, said members being arranged in a stack whereby said second member is in frictional contact with said other members, said second member being of substantially larger diameter than the other members and capable of substantial lateral movement relative thereto; structure providing a fixed friction surface about said housing adjacent said first member; spring means engaging said third annular member to compress said stack against said fixed friction surface; continuous wall means surounding said second annular member on a circle of larger diameter; and means for securing said wall means for engagement by the rim of said second annular member to displace the same transversely of said first and third members in the circumstance of gyration of said housing beyond a predetermined minimum.

2. In a mechanism having a generally vertical rotatable shaft having fixed to its upper end a body which may include an unbalanced load, drive means arranged to rotate said shaft, a housing disposed about said body and providing journalling means for said shaft, and means for supporting said housing for gyratory movement about a node; the improvement in means for damping said movement, comprising first and second and third annular members encircling said housing and capable of axial displacement relative thereto, said members being arranged in a stack whereby said second member is confined between said other members, said second member being of substantially larger diameter than the other members and capable of substantial lateral movement relative thereto; structure providing a fixed friction surface about said housing adjacent said first member; spring means engaging said third annular member to compress said stack against said fixed friction surface; and wall means fixed about said second annular member for engagement by the rim thereof to displace said member transversely of said first and third members in frictional contact therewith in the circumstance of gyration of said housing beyond a predetermined minimum.

3. In a mechanism having a generally vertical rotatable shaft having fixed to its upper end a body which may include an unbalanced load, drive means arranged to rotate said shaft, a housing disposed about said body and providing journalling means for said shaft, and means for supporting said housing for gyratory movement about a node; the improvement in means for damping said movement, comprising a plurality of annular members encircling said housing and capable of axial displacement relative thereto, said members being arranged in a stack whereby an intermediate member is in frictional contact with other members, said intermediate member extending radially outwardly of the other members and capable of substantial lateral movement relative to said housing, structure providing a fixed friction surface about said housing adjacent an end member of said stack, spring means engaging another member of said stack to compress said stack against said fixed friction surface, and wall means fixed radially outward of said intermediate member to be engaged thereby in the circumstance of gyration of said housing beyond a predetermined minimum, whereby said intermediate member will be displaced relative to said other members of the stack and offer additional frictional resistance to said gyration.

4. In a mechanism having a rotatable shaft to which is affixed a body which may include a load unbalanced relative to said shaft axis, drive means arranged to rotate said shaft, a housing for journalling said shaft, and means supporting said housing for gyratory movement about a node; the improvement in means for damping said movement, comprising a unitary structure extending about said housing to present a fixed friction surface normal to the axis thereof; first and second and third annular discs disposed about said housing for gyratory movement therewith, said discs being arranged in a stack whereby the second disc is in friction contact with the others, said second disc being of larger diameter than the others and capable of substantial lateral displacement relative thereto; spring means for compressing said stack against said fixed friction surface whereby the first disc provides a first frictional opposition to gyration of said housing, and means effective in the circumstance of gyration of said housing beyond a predetermined minimum to cause lateral displacement of said second disc relative to the others and thereby to provide additional frictional opposition to said gyration.

5. In a mechanism having a rotatable shaft to which is affixed a body which may include a load unbalanced relative to said shaft axis, drive means arranged to rotate said shaft, a housing for journalling said shaft, and means supporting said housing for gyratory movement about a node; the improvement in means for damping said movement, comprising structure extending about said housing to present a fixed friction surface normal to the axis thereof; first and second and third annular discs disposed about said housing for gyratory movement therewith, said discs being arranged in a stack whereby the second disc is in friction contact with the others, said first and third discs accommodating passage of said housing with little clearance therebetween and said second disc being of larger diameter than the others and capable of substantial lateral and gyratory displacement relative thereto; spring means for compressing said stack against said fixed friction surface whereby the first disc provides a first frictional opposition to gyration of said housing; and means effective in the circumstance of gyration of said housing beyond a predetermined minimum to cause lateral displacement of said second disc relative to the others and thereby to provide additional frictional opposition to said gyration.

6. In a mechanism having a rotatable shaft to which is affixed a body which may include a load unbalanced relative to said shaft axis, drive means arranged to rotate said shaft, a housing for journalling said shaft, and means supporting said housing for gyrating movement about a node; the improvement in means for damping said movement, comprising structure providing a fixed friction surface surrounding said housing normal to the axis thereof; first and second annular friction discs disposed about said housing for gyratory movement therewith and axial displacement relative thereto, said discs being arranged one on the other, there being a resilient annulus between said first disc and said housing and said second disc having a substantial clearance relative to said housing whereby it is capable of substantial lateral displacement relative to said housing and said first disc; spring means arranged to urge said discs into frictional contact with each other while placing said first disc in frictional contact with said fixed friction surface to provide a first frictional opposition to gyration of said housing; and means effective in the circumstance of gyration of said housing beyond a predetermined minimum to cause lateral displacement of said second disc relative to the first and thereby to provide additional frictional opposition to said gyration.

7. Gyration damping means according to claim 6 in which the said lateral displacement of said second disc is effected by the engagement of wall means therewith during said last named condition of gyration.

8. Gyration damping means according to claim 6 in which the means for effecting the said lateral displacement of said second disc includes wall means fixed radially outwardly thereof and engageable thereby during said last named condition of gyration.

9. Gyration damping means according to claim 6 in which the coefficient of friction between said first disc and the fixed friction surface is substantially different from that between said first and second discs.

10. Gyration damping means according to claim 6 in which the coefficient of friction between said first disc and said friction surface is greater than that between said first and second discs.

11. In a mechanism having a rotatable shaft to which is affixed a body which may include a load eccentric to the shaft axis, drive means arranged to rotate said shaft, a housing for journalling said shaft, and means supporting said housing for gyration about a node; the improvement in means for damping said gyrations comprising structure extending about said housing to present a fixed friction surface normal to the axis thereof, a first annular friction disc closely embracing said housing for gyration therewith and frictional engagement with said fixed friction surface, a second annular friction disc embracing said housing with substantial clearance relative thereto for frictional engagement with said first disc and lateral displacement relative to said first disc and housing, resilient means for effecting the respective frictional engagements, and means effective during gyration of said housing beyond a predetermined minimum to cause lateral displacement of said second disc while the same is in frictional contact with said first disc.

References Cited in the file of this patent

UNITED STATES PATENTS

| | | |
|---|---|---|
| 2,513,844 | Castner et al. | July 4, 1950 |
| 2,647,591 | Young | Aug. 4, 1953 |
| 2,987,189 | Evjen | June 6, 1961 |

FOREIGN PATENTS

| | | |
|---|---|---|
| 874,769 | Great Britain | Aug. 10, 1961 |